(12) United States Patent
Mielenz

(10) Patent No.: US 10,239,532 B2
(45) Date of Patent: Mar. 26, 2019

(54) METHOD FOR OPERATING A DRIVER ASSISTANCE SYSTEM, AND DRIVER ASSISTANCE SYSTEM

(71) Applicant: Robert Bosch GmbH, Stuttgart (DE)

(72) Inventor: Holger Mielenz, Ostfildern (DE)

(73) Assignee: ROBERT BOSCH GMBH, Stuttgart (DE)

( * ) Notice: Subject to any disclaimer, the term of this patent is extended or adjusted under 35 U.S.C. 154(b) by 121 days.

(21) Appl. No.: 15/523,586

(22) PCT Filed: Sep. 10, 2015

(86) PCT No.: PCT/EP2015/070677
§ 371 (c)(1),
(2) Date: May 1, 2017

(87) PCT Pub. No.: WO2016/074819
PCT Pub. Date: May 19, 2016

(65) Prior Publication Data
US 2017/0305465 A1    Oct. 26, 2017

(30) Foreign Application Priority Data

Nov. 10, 2014   (DE) .................. 10 2014 222 836

(51) Int. Cl.
*B60W 30/18*      (2012.01)

(52) U.S. Cl.
CPC   *B60W 30/18163* (2013.01); *B60W 30/18145* (2013.01); *B60W 2550/141* (2013.01)

(58) Field of Classification Search
CPC .. B60W 2550/14; B60W 2550/141–2550/148; B60Q 30/12;
(Continued)

(56) References Cited

U.S. PATENT DOCUMENTS 5,521,579 A * 5/1996 Bernhard .......... B60K 31/0008
                                                              180/167
2005/0273260 A1* 12/2005 Nishida .................. B60Q 1/34
                                                              701/301
(Continued)

FOREIGN PATENT DOCUMENTS

DE          10012737 A1    9/2001
DE       102005014309 A1   10/2006
(Continued)

OTHER PUBLICATIONS

International Search Report for PCT/EP2015/070677, dated Jan. 4, 2016.

*Primary Examiner* — Dale Moyer
(74) *Attorney, Agent, or Firm* — Norton Rose Fulbright US LLP; Gerard Messina

(57) ABSTRACT

A method for operating a driver-assistance system for the lateral guidance of a motor vehicle in a lane change from a current lane to a target lane in a traffic-lane split. Also provided is a driver-assistance system for the lateral guidance of a motor vehicle in a lane change from a current lane to a target lane in a traffic-lane split. The driver-assistance system encompasses a trajectory-ascertainment device, which is configured to ascertain a trajectory for the lane change of the motor vehicle from the current lane to the target lane so that the lane change from the current lane to the target lane is carried out at a predefined point in time following the traffic-lane split.

10 Claims, 3 Drawing Sheets

(58) Field of Classification Search
CPC ........ B60W 30/18163; G06K 9/00798; G06K
9/00791; B60Y 2300/12; G01C 21/3658;
G08G 1/167; B60T 2201/08; B60T
2210/36; B60T 2210/32; B60R 2300/804;
G06T 2207/30256
See application file for complete search history.

(56) References Cited

U.S. PATENT DOCUMENTS

| | | | | |
|---|---|---|---|---|
| 2009/0271071 | A1* | 10/2009 | Buerkel | B60T 8/17557 |
| | | | | 701/41 |
| 2010/0017117 | A1* | 1/2010 | Irie | G01C 21/3658 |
| | | | | 701/532 |
| 2015/0367778 | A1* | 12/2015 | Vladimerou | G06K 9/00798 |
| | | | | 348/148 |
| 2016/0314358 | A1* | 10/2016 | Kushida | G06K 9/00798 |
| 2017/0341653 | A1* | 11/2017 | Kubota | B60W 50/0097 |
| 2018/0099676 | A1* | 4/2018 | Goto | B60W 30/10 |

FOREIGN PATENT DOCUMENTS

| | | |
|---|---|---|
| DE | 102006047636 A1 | 4/2008 |
| JP | 2008126985 A | 6/2008 |
| JP | 2010009249 A | 1/2010 |
| JP | 2013210321 A | 10/2013 |

* cited by examiner

METHOD FOR OPERATING A DRIVER ASSISTANCE SYSTEM, AND DRIVER ASSISTANCE SYSTEM

FIELD OF THE INVENTION

The present invention relates to a method for operating a driver-assistance system for the lateral guidance of a vehicle in case of a lane change at a traffic-lane split. The present invention also relates to a driver-assistance system.

BACKGROUND INFORMATION

Driver-assistance systems, which assist the driver in guiding the vehicle or which are also able to carry out driving maneuvers in a fully automated manner, are increasingly used in modern motor vehicles. One function of these systems consists of lane-change assistance. In such cases, the position of the vehicle in relation to an ascertained target lane is sensed and compared with a setpoint value. The output signal then consists of an actuating signal for an actuator that intervenes in the lateral guidance system of the vehicle, for instance in order to assist the driver through an additional steering torque, or in order to execute a fully autonomous lateral guidance that no longer requires an intervention on the part of the driver.

For example, a method for assisting the driver of a vehicle in a lane change is discussed in German patent document DE 43 13 568 C1. In this case, vehicles in the adjacent target lane are detected and their speeds and their distances from the own vehicle as well as safety distances are ascertained and employed as the basis for the decision as to whether a gap that is suitable for a lane change is available.

German patent document DE 100 12 737 B4 discusses a lane-change assistant, which offers assistance to the driver in the lateral guidance. To do so, a lateral position trajectory is ascertained as a function of positional and traffic lane information, and an intervention in the lateral vehicle guidance is undertaken in accordance with the ascertained lateral position trajectory.

SUMMARY OF THE INVENTION

The present invention provides a method for operating a driver-assistance system for the lateral guidance of a vehicle in a lane change when encountering a traffic-lane split, the method having the features described herein. It also provides a driver-assistance system for the lateral guidance of a motor vehicle in a lane change in the presence of a traffic-lane split, the system having the features described herein.

Accordingly, a method for operating a driver-assistance system for the lateral guidance of a motor vehicle in a lane change from a current lane to a target lane in a traffic-lane split is provided, the method encompassing the following method steps:

(S1) Sensing the traffic-lane split of the current lane in which the motor vehicle is located;
(S2) Ascertaining the position of the motor vehicle in relation to the traffic-lane split;
(S3) Ascertaining a trajectory for the lane change of the motor vehicle from the current lane to the target lane in such a way that the lane change from the current lane to the target lane is carried out at a predefined point in time following the traffic-lane split;
(S4) Operating the driver-assistance system in such a way that the lane change is carried out in accordance with the ascertained trajectory.

Furthermore, a driver-assistance system for the lateral guidance of a motor vehicle in case of a lane change from a current lane to a target lane in the presence of a traffic-lane split is made available. The driver-assistance system encompasses a lane-split detection device, which is configured to detect the traffic lane split of the current lane in which the motor vehicle is located; it also has a vehicle-position ascertainment device, which is configured to ascertain the position of the motor vehicle in relation to the detected traffic-lane split. The driver-assistance system also includes a trajectory ascertainment device, which is configured to ascertain a trajectory for the lane change of the motor vehicle from the current lane to the target lane in such a way that the lane change from the current lane to the target lane is carried out at a predefined point in time following the traffic lane split.

Further refinements are the subject matter of the respective further descriptions herein.

One aspect of the present invention consists of ascertaining the trajectory for a lane change in such a way that a trailing vehicle is unable to reach the desired target lane beforehand, thereby representing a collision risk in the event of a lane change of the own vehicle.

The method according to the present invention and the driver-assistance system according to the present invention make it possible to reduce the collision risk of a vehicle equipped with a driver-assistance system that provides lateral guidance assistance during the execution of a lane change at traffic lane splits, and in particular at inner-city traffic intersections.

For example, if a lane change or a turning operation is desired while the driver-assistance system if following a previously determined route to reach a destination, the method according to the present invention ascertains the trajectory for the lane change in these types of situations in such a way that the lane change is carried out at a predetermined point in time, e.g., directly upon arriving at the traffic lane split. This makes it impossible for possibly following traffic to reach the desired target lane earlier and to pose a collision risk in case of a lane change of the own vehicle.

According to a further development, the predefined point in time is the earliest possible point in time for a lane change from the current lane to the target lane after the traffic lane split. This specific embodiment ensures that no other motor vehicle is able to reach the target lane before the own motor vehicle does. This specific embodiment, too, makes it possible to avoid potential merging problems prior to reaching the target lane because the target lane is reached in a timely manner.

According to a further development, the trajectory is ascertained while taking a predefined maximum lateral acceleration of the motor vehicle into account. For example, the driver of the motor vehicle is able to define that the maximum lateral acceleration of the motor vehicle should not exceed 3 $m/s^2$ during the lane change from the current lane to the target lane. The trajectory for the lane change of the motor vehicle from the current lane to the target lane is then defined in such a way that the lateral acceleration of the vehicle during the lane change will not exceed 3 $m/s^2$. The specifiable value for the lateral acceleration may be freely and infinitely selectable. For example, the specifiable value for the lateral acceleration may have a value range from 0.5 $m/s^2$ to 20 $m/s^2$. This makes it possible to adapt the comfort of the vehicle passengers or the driving mode of the vehicle to the individual requirements of the driver.

According to another further development, the trajectory is ascertained taking a predefined maximum distance of the motor vehicle from the lane restriction into account. For example, the driver may specify that the maximum distance to the lane restriction, which is normally the lateral lane restriction at which the lane split occurs, is to amount to 30 cm at most. The trajectory for the lane change is then defined in such a way that the distance of the vehicle from the lane restriction will not exceed 30 cm. The specifiable value for the maximum distance from the traffic lane restriction may also be freely and infinitely selectable.

It is also possible that the trajectory is ascertained in accordance with the traffic lane restriction. This means that the trajectory is determined essentially in parallel with the traffic lane restriction. The maximum distance to the traffic lane restriction is able to be specified for this type of trajectory ascertainment too. For example, the driver may specify that a trajectory parallel to the traffic lane restriction be determined and that the distance from the traffic lane restriction should amount to 30 cm.

According to another further development, the trajectory is ascertained while taking the subsequent lane topology into account. For example, in case of multiple traffic-lane splits, it may be advantageous to change lanes only at a later point in time. This may make the lane change even more pleasant since fewer lane changes are required to reach the target lane.

According to another further refinement, the lane-split detection device includes at least one sensor, which is configured to identify road markings. For example, the lane-split detection device includes an ultrasonic sensor, radar, lidar and/or a camera, which is/are configured to sense or detect road markings and thus a traffic lane split. The lane-split detection device may also avail itself of sensors already installed in the vehicle to sense a traffic lane split. This makes it possible to reduce the costs because there is no need to install additional sensors for the method according to the present invention and for the driver-assistance system according to the present invention.

According to another further development, the lane-split detection device and/or the vehicle-position ascertainment device is/are coupled with a navigation system. The navigation system may include a highly precise map of the traffic lanes to be traveled in, in which the traffic lane splits are identified. In addition, the navigation device may include a very accurate position-ascertainment system, which allows for an ascertainment of the position of the vehicle on the map of the navigation system. In this way the driver-assistance system according to the present invention is able to cooperate with the navigation system, sense the traffic lane split and ascertain the position of the motor vehicle in relation to the traffic lane split. Costs are also able to be reduced in this way because already existing systems can be used for the driver-assistance system according to the present invention.

According to another further development, the driver-assistance system is configured as a semi-automatic or fully automatic driver-assistance system. For example, the driver-assistance system is able to perform the lane change according to the ascertained trajectory by lateral and/or longitudinal guidance actuators in a fully automatic manner, or the driver-assistance system may merely assist the driver in the lane change, for example by acoustic, optical and/or haptic signals that support the driver in following the ascertained trajectory.

In the following text, additional features and advantages of the present invention are explained on the basis of specific embodiments and with reference to the figures.

Identical reference numerals in the figures denote the same or functionally corresponding elements.

DETAILED DESCRIPTION

Figure 1:
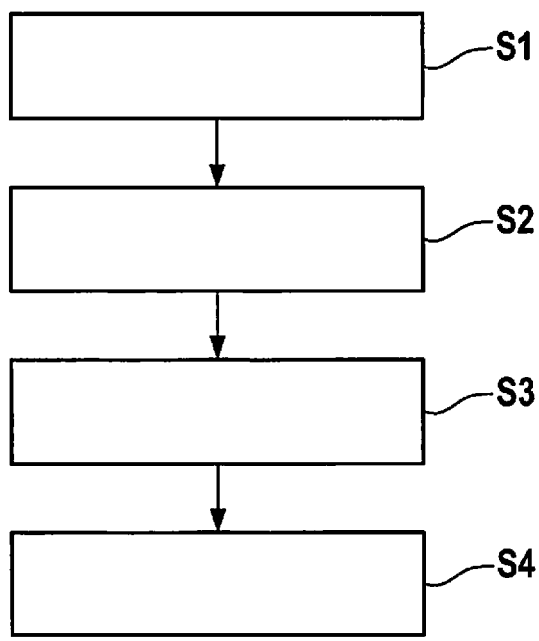
FIG. 1 shows a schematic flow diagram, which illustrates a method for operating a driver-assistance system for the lateral guidance of a motor vehicle in a lane change in the event of a traffic lane split, according to a specific embodiment of the present invention.

FIG. 1 shows a schematic flow diagram, which illustrates a method for operating a driver-assistance system 1 for the lateral guidance of a motor vehicle 3 in a lane change at a traffic-lane split 40 according to a specific embodiment of the present invention. In a first method step S1, traffic-lane split 40 of current lane 10 in which motor vehicle 3 is located is sensed. In a further method step S2, the position of motor vehicle 3 in relation to traffic-lane split 40 is ascertained. In a further method step S3, a trajectory 7 is determined for the lane change of motor vehicle 3 from current lane 10 to target lane 11 in such a way that the lane change from current lane 10 to target lane 11 is executed at a predefined point in time after traffic-lane split 40. In an additional method step S4, driver-assistance system 1 is operated in such a way that the lane change is carried out according to determined trajectory 7. Additional method steps may follow and/or may take place in-between.

Figure 2:
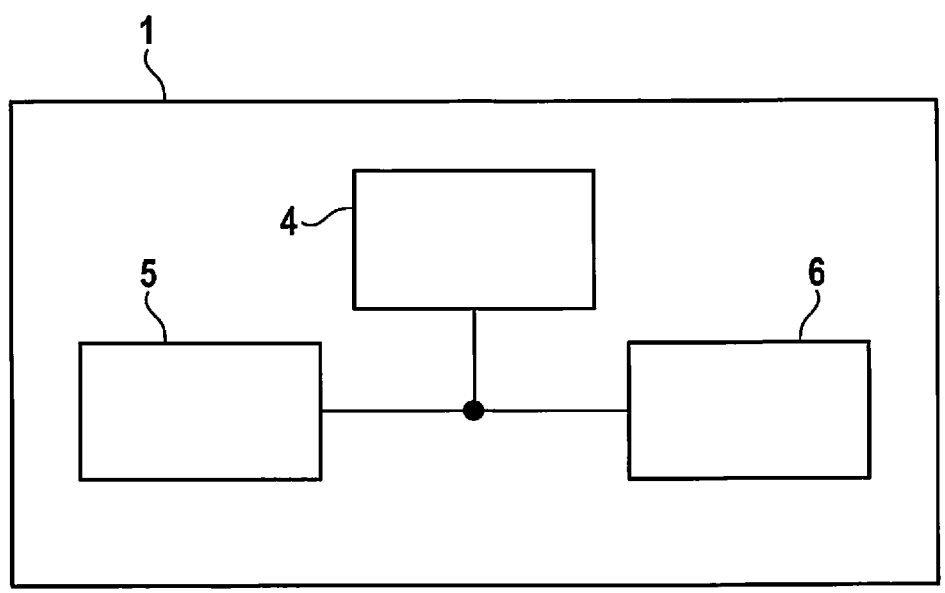
FIG. 2 shows a schematic block diagram, which illustrates a driver-assistance system for the lateral guidance of a motor vehicle in a lane change in the event of a traffic lane split, according to a specific embodiment of the present invention.

FIG. 2 shows a schematic flow diagram, which depicts a driver-assistance system 1 for the lateral guidance of a vehicle 3 in a lane change from a current lane 10 to a target lane 11 in case of a traffic-lane split 40 according to a specific embodiment. Driver-assistance system 1 has a lane-split detection device 4, which is configured to sense traffic-lane split 40 of current lane 11 in which motor vehicle 3 is located. In addition, driver-assistance system 1 includes a vehicle-position ascertainment device 5, which is configured to ascertain the position of motor vehicle 3 in relation to detected traffic-lane split 40. Moreover, driver-assistance system 1 includes a trajectory-ascertainment device 6, which is configured to ascertain a trajectory 7 for the lane change of motor vehicle 3 from current lane 10 to target lane 11, in such a way that the lane change from current lane 10 to target lane 11 is executed at a predefined point in time following traffic-lane split 40. Further devices such as a camera and/or a navigation system may be coupled with driver-assistance system 1.

Figure 3:
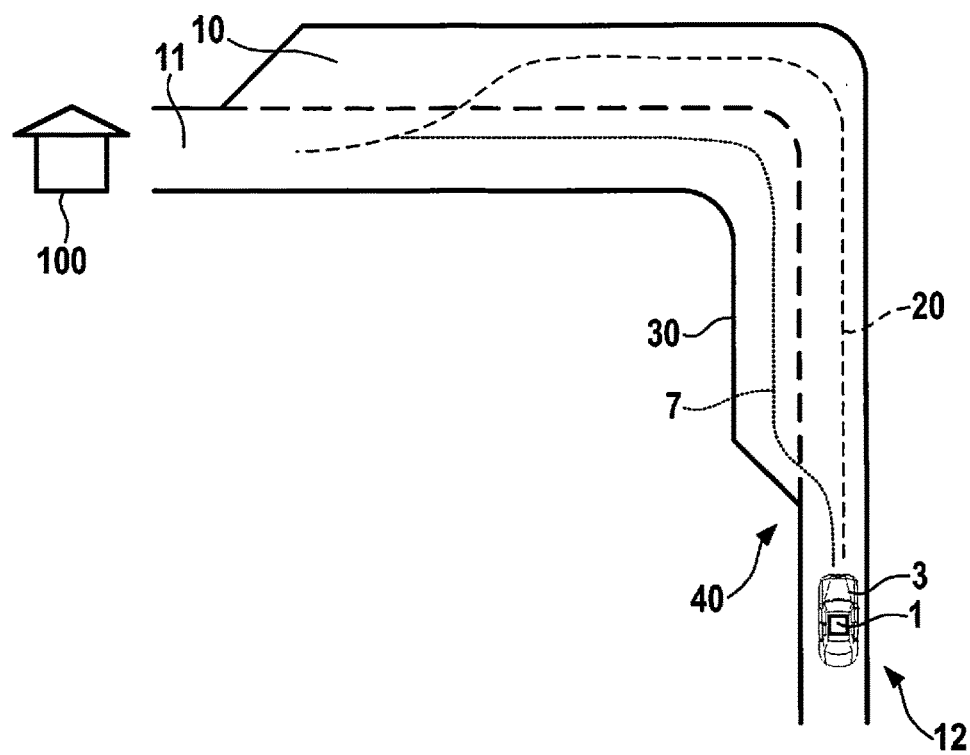
FIG. 3 shows a schematic plan view of a traffic situation.

FIG. 3 shows a road 12 on which a motor vehicle 3 is located. Motor vehicle 3 is located in traffic lane 10, which represents current lane 10. To reach destination 100, motor vehicle 3 must basically follow trajectory 20. However, the lane change along trajectory 20 may pose a certain risk because during a lane change from current lane 10 to target lane 11, the driver might fail to notice a vehicle that has already switched to target lane 11 at traffic-lane split 40 and which is located in the blind spot of the vehicle driver of motor vehicle 3. To avoid such situations, motor vehicle 3 is equipped with a driver-assistance system 1 according to the present invention. Traffic-lane split 40 of current lane 40, in which motor vehicle 3 is located, is sensed with the aid of lane-split detection device 4. Vehicle-position ascertainment device 5 then ascertains the position of motor vehicle 3 in relation to traffic-lane split 40. Trajectory-ascertainment device 6 uses sensed traffic-lane split 40 as well as the ascertained position of the motor vehicle in relation to traffic-lane split 40 as the basis for ascertaining a trajectory 7 for the lane change of motor vehicle 3 from current lane 10 to target lane 11 in such a way that the lane change from current lane 10 to target lane 11 is carried out at a predefined point in time following traffic-lane split 40.

In the illustrated traffic situation, trajectory 7 for the lane change is determined in such a way that the lane change takes place as early as possible following traffic-lane split 40. In other words, motor vehicle 3 switches to target lane 11 immediately after traffic-lane split 40 is reached. For example, this makes it impossible for another vehicle that is possibly also located in current lane 10 to switch to target lane 11 before own vehicle 3 does. In this way the collision risk during lane changes of motor vehicles is able to be reduced. Driver-assistance system 1 is configured to guide motor vehicle 3 from current lane 10 to target lane 11 according to determined trajectory 7, or to assist and/or actively support the driver in following the trajectory by optical, acoustic and/or haptic signals.

Figure 4:
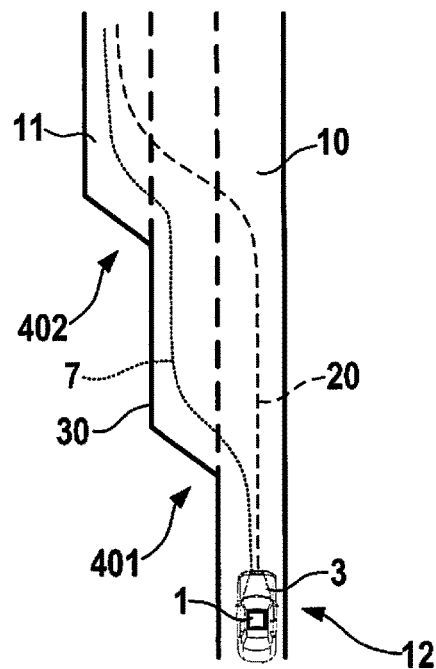
FIG. 4 shows a schematic plan view of an additional traffic situation.

FIG. 4 shows a schematic plan view of an additional traffic situation. Motor vehicle 3 is equipped with a driver-assistance system 1 according to the present invention. In the traffic situation illustrated, the first split of traffic lane 10 occurs at traffic-lane split 401, and the second split takes place at traffic-lane split 402. Traffic-lane splits 401 and 402 are detected with the aid of lane-split detection device 4. Vehicle-position ascertainment device 5 then determines the position of motor vehicle 3 relative to traffic-lane split 401 and relative to traffic-lane split 402. Trajectory-ascertainment device 6 ascertains a trajectory 7 for the lane change of motor vehicle 3 from current lane 10 to target lane 11 on the basis of detected traffic-lane splits 401 and 402 and the ascertained position of the motor vehicle in relation to traffic-lane splits 401 and 402; this takes place in such a way that the lane change from current lane 10 to target lane 11 is executed at a predefined point in time following traffic-lane split 401 and at a predefined point in time following traffic-lane split 402. In the traffic situation illustrated, trajectory 7 for the lane change is determined in such a way that the lane change takes place as early as possible following traffic-lane split 401 and as early as possible following traffic-lane split 402. In this way no other motor vehicle that is also located in current lane 10, for example, is able to switch to target lane 11 before motor vehicle 3 does.

Figure 5:
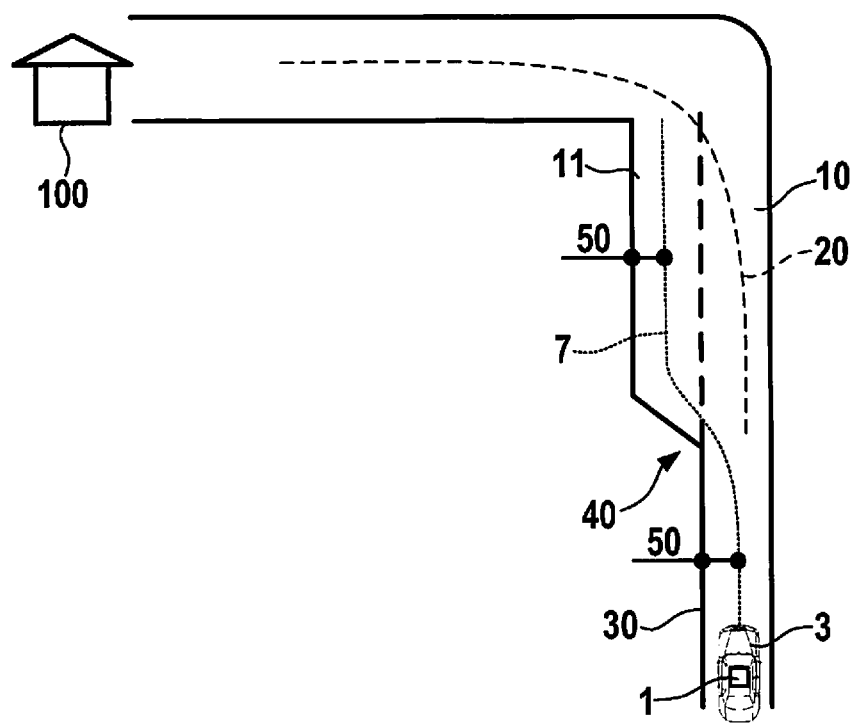
FIG. 5 shows a schematic plan view of another traffic situation.

FIG. 5 shows a schematic plan view of another traffic situation. Motor vehicle 3 includes a driver-assistance system 1 according to the present invention.

Traffic-lane split 40 of current lane 10 in which motor vehicle 3 is located is ascertained with the aid of lane-split detection device 4. To ascertain traffic-lane split 40, lane-split detection device 4 includes an ultrasonic sensor, a camera and/or lidar, and/or is coupled with a navigation system, for example. Vehicle-position ascertainment device 5 ascertains the position of motor vehicle 3 in relation to traffic-lane split 40. Trajectory-ascertainment device 6 determines a trajectory 7 for the lane change of motor vehicle 3 from current lane 10 to target lane 11 in such a way that the lane change from current lane 10 to target lane 11 is executed at a predefined point in time following traffic-lane split 40, this trajectory ascertainment being based on detected traffic-lane split 40 and the ascertained position of motor vehicle 3 in relation to traffic-lane split 40.

In the traffic situation illustrated, trajectory 7 for the lane change is ascertained in such a way that trajectory 7 in principle extends parallel to traffic-lane restriction 30. It is also possible that the trajectory is determined while taking a predefined maximum distance 50 from traffic-lane restriction 30 into account. For example, the driver may specify that maximum distance 50 between the motor vehicle and traffic-lane restriction 30 amount to 10 cm, 20 cm, 30 cm, or 40 cm. This makes it impossible for another vehicle, e.g., also motorcycles, that is/are located in current lane 10 to change to target lane 11 before motor vehicle 3 does. If a vehicle were to follow trajectory 20 to reach destination 100, the danger of a collision with a motor vehicle already traveling in target lane 11 would be increased.

Furthermore, trajectory 7 for the lane change in the illustrated specific embodiment is ascertained while taking a predefined maximum lateral acceleration of motor vehicle 3 into account. In order not to exceed the maximum lateral acceleration of the motor vehicle, the speed of vehicle 3 is adapted to trajectory 7 that extends in parallel with the traffic lane restriction.

What is claimed is:

1. A method for operating a driver-assistance system for providing lateral guidance of a motor vehicle in a lane change from a current lane to a target lane in a traffic-lane split, the method comprising:
   sensing the traffic-lane split of the current lane in which the motor vehicle is located;
   ascertaining a position of the motor vehicle in relation to the traffic-lane split;
   ascertaining a trajectory for the lane change of the motor vehicle from the current lane to the target lane so that the lane change from the current lane to the target lane is carried out at a predefined point in time following the traffic-lane split; and
   operating the driver-assistance system so that the lane change is carried out in accordance with the ascertained trajectory;
   wherein the predefined point in time is the earliest possible point in time for a lane change from the current lane to the target lane following the traffic-lane split.

2. The method of claim 1, wherein the trajectory is ascertained while taking a predefined maximum distance of the motor vehicle from a traffic-lane restriction into account.

3. The method of claim 1, wherein the trajectory is ascertained while taking a traffic-lane topography subsequent to the traffic-lane split into account.

4. The method of claim 1, wherein the trajectory is ascertained parallel to a traffic-lane restriction.

5. A method for operating a driver-assistance system for providing lateral guidance of a motor vehicle in a lane change from a current lane to a target lane in a traffic-lane split, the method comprising:
   sensing the traffic-lane split of the current lane in which the motor vehicle is located;
   ascertaining a position of the motor vehicle in relation to the traffic-lane split;
   ascertaining a trajectory for the lane change of the motor vehicle from the current lane to the target lane so that the lane change from the current lane to the target lane is carried out at a predefined point in time following the traffic-lane split; and operating the driver-assistance system so that the lane change is carried out in accordance with the ascertained trajectory;

wherein the trajectory is ascertained while taking a predefined maximum lateral acceleration of the motor vehicle into account.

6. A driver-assistance system for providing lateral guidance of a motor vehicle in a lane change from a current lane to a target lane in a traffic-lane split, comprising:

a lane-split detection device to detect the traffic-lane split of the current lane in which the motor vehicle is located;

a vehicle-position ascertainment device to ascertain the position of the motor vehicle in relation to the detected traffic-lane split; and a trajectory-ascertainment device to ascertain a trajectory for the lane change of the motor vehicle from the current lane to the target lane so that the lane change from the current lane to the target lane is carried out at a predefined point in time following the traffic-lane split;

wherein the predefined point in time is the earliest possible point in time for a lane change from the current lane to the target lane following the traffic-lane split.

7. The driver-assistance system of claim 6, wherein the lane-split detection device includes at least one sensor, which is configured to identify traffic-lane markings.

8. The driver-assistance system of claim 6, wherein at least one of the lane-split detection device and the vehicle-position ascertainment device is coupled with a navigation system.

9. The driver-assistance system of claim 6, wherein the driver-assistance system is configured as a semi-automatic or a fully automatic driver-assistance system.

10. A driver-assistance system for providing lateral guidance of a motor vehicle in a lane change from a current lane to a target lane in a traffic-lane split, comprising:

a lane-split detection device to detect the traffic-lane split of the current lane in which the motor vehicle is located;

a vehicle-position ascertainment device to ascertain the position of the motor vehicle in relation to the detected traffic-lane split; and a trajectory-ascertainment device to ascertain a trajectory for the lane change of the motor vehicle from the current lane to the target lane so that the lane change from the current lane to the target lane is carried out at a predefined point in time following the traffic-lane split;

wherein the trajectory is ascertained while taking a predefined maximum lateral acceleration of the motor vehicle into account.

\* \* \* \* \*